United States Patent [19]

Sood et al.

[11] Patent Number: 4,986,092
[45] Date of Patent: Jan. 22, 1991

[54] SPEED CONTROL FOR INVERTER DRIVEN WASHING MACHINE

[75] Inventors: Pradeep K. Sood; John S. Thorn, both of St. Louis County, Mo.

[73] Assignee: Emerson Electric Co., St. Louis, Mo.

[21] Appl. No.: 336,886

[22] Filed: Apr. 12, 1989

[51] Int. Cl.$^5$ .............................................. D06F 33/02
[52] U.S. Cl. ............................... 68/12.00 R; 68/13 R; 68/139; 318/257
[58] Field of Search ................ 68/13 R, 12 R, 139; 318/293, 252, 257

[56] References Cited

U.S. PATENT DOCUMENTS

| | | | |
|---|---|---|---|
| 2,935,674 | 5/1960 | Honne, Jr. | 68/12 R |
| 3,095,534 | 6/1963 | Cockrell | 68/12 R |
| 3,152,462 | 10/1964 | Elliott et al. | 18/12 R |
| 3,152,463 | 10/1964 | Sones et al. | 68/12 R |
| 3,248,908 | 5/1966 | Pope | 68/12 R |
| 3,264,544 | 6/1966 | Bowers | 68/12 R X |
| 4,400,838 | 8/1983 | Steers | 68/12 R X |
| 4,741,182 | 5/1988 | Dider et al. | 68/12 R |
| 4,743,820 | 5/1988 | Veach | 68/12 R |
| 4,862,710 | 9/1987 | Torita et al. | 68/12 R |

Primary Examiner—Frankie L. Stinson
Attorney, Agent, or Firm—Polster, Polster and Lucchesi

[57] ABSTRACT

A washing machine has a rotatable drum for holding items being washed and water for washing the items. The number of items in the drum and the amount of water in the drum may vary. Power is supplied from an inverter to a motor which rotates the rotatable drum. A speed control responsive to the inverter current regulates the drum rotating speed within a selected range.

11 Claims, 1 Drawing Sheet

SPEED CONTROL FOR INVERTER DRIVEN WASHING MACHINE

BACKGROUND OF THE INVENTION

This invention relates to washing machines, and more particularly to speed control circuits for regulating the rotating speed of the rotatable drum of a washing machine.

In washing machines such as those commonly found in the home, the quality of the wash depends upon the drum speed of the washing machine remaining relatively constant (i.e., within three percent or so of its nominal value) even though conditions may vary widely. For example, the amount of clothes and the amount of water within a washing machine drum vary from wash to wash and even during a wash cycle. If the drum speed is not held relatively constant despite these varying conditions, the quality of the wash degrades as the drum speed changes with different amounts of water and clothes present or when their distribution in the drum changes during the wash cycle. It is therefore a problem to maintain the desired drum rotating speed throughout the wash cycle or from wash to wash.

Methods of regulating drum speed currently being used involve either direct speed sensing, sensing of motor currents or open loop compensation. Use of sensors is undesirable because they greatly add to the cost of the control circuitry within the washing machine and/or lower the reliability of the system. Open loop compensation by simply moving up and down the voltage-frequency curve is not accurate enough, particularly when variations in the washing machine operating parameters are taken into account.

SUMMARY OF THE INVENTION

Among the several objects of the present invention may be noted the provision of an improved speed control system for regulating the rotating speed of a washing machine drum.

Another object is the provision of such a speed control system for regulating the speed to within a preselected range of rotating speeds.

A third object is the provision of such a speed control system for achieving a high degree of control over drum rotating speeds utilizing only sensing and control circuitry already existing within the inverter that drives the washing machine.

A fourth object is the provision of such a speed control system which reduces flux within the induction motor which drives the drum, particularly when light loads are being washed.

A fifth object is the provision of such a speed control system which reduces losses and acoustic noise generated by the induction motor.

Other objects and features will be in part apparent and in part pointed out hereinafter.

In a washing machine speed control of the present invention the washing machine has a rotatable washing drum for holding items to be washed and water for washing the items. An induction motor powered by an inverter rotatably drives the drum. The rotating speed of the drum at any one time tends to be dependent upon the number of items being washed and the amount of water in the drum at that time. The speed control regulates the drum speed within a preselected speed range and includes circuitry for sensing the inverter voltage, circuitry for sensing the inverter current, and speed maintaining circuitry responsive solely to the inverter current and the inverter voltage to maintain the drum speed within the selected range.

The method of the present invention controls the rotating speed of a washing machine drum within a selected speed range regardless of the load or the amount of water contained in the drum at any one time. That method includes sensing the current of an inverter used with an induction motor by which the drum is rotatably driven and supplying the sensed current value to a microprocessor having a memory which contains load information as a function of the sensed current. A value of at least one desired characteristic of the electrical power to be supplied to the inverter and/or the frequency of the inverter output is determined from the load information stored in the memory and the sensed current. An input to a front end converter which supplies electrical power to the inverter and/or the frequency of the inverter output is adjusted to cause the characteristic to approach its desired value so that the induction motor drives the drum at a rotating speed within the selected range.

DESCRIPTION OF THE PREFERRED EMBODIMENT

Figure 1:
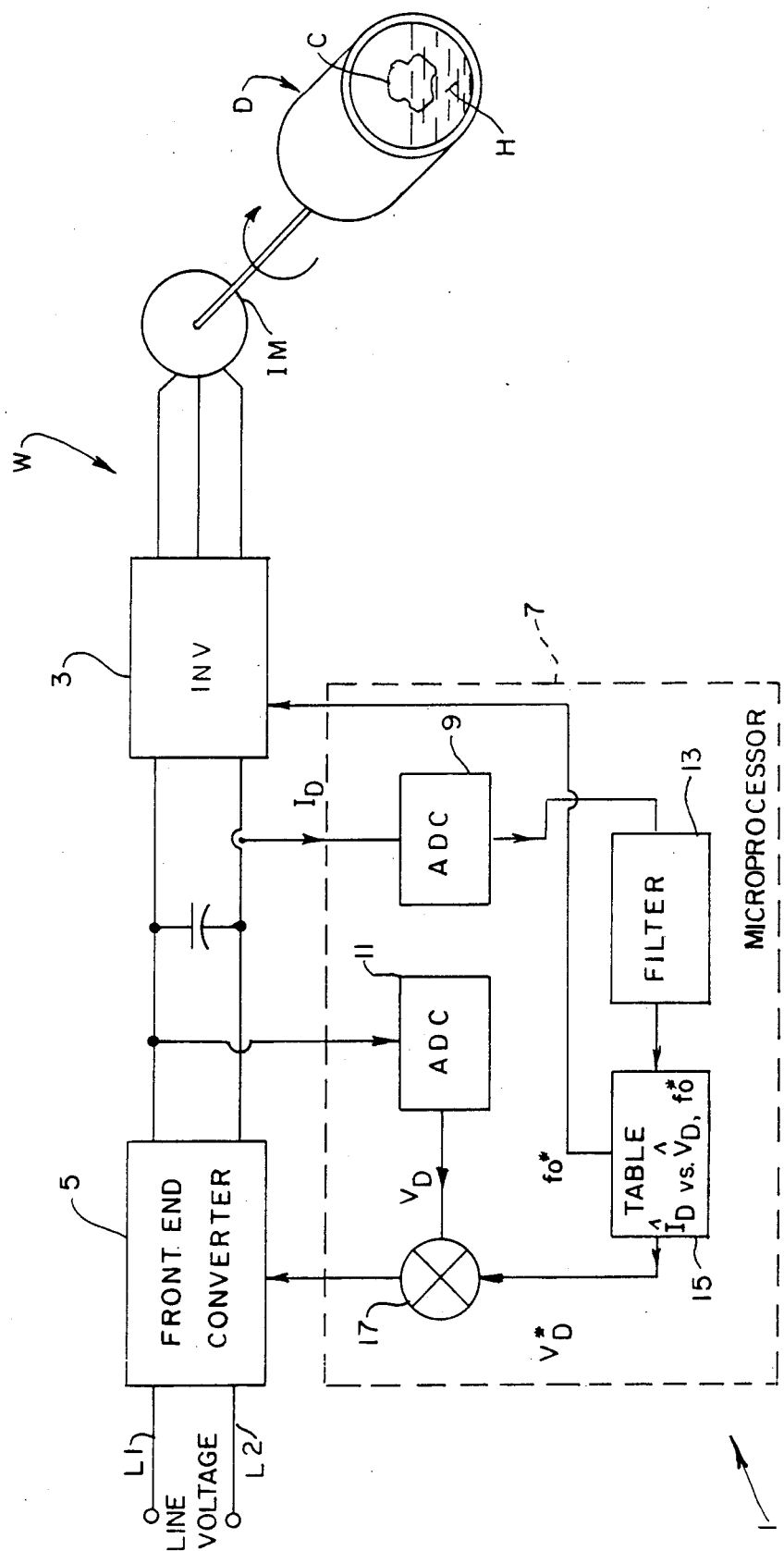
FIG. 1 is a block diagram representation of a speed control system of the present invention.

Referring now to the drawing, a washing machine W has a rotatable washing drum D holding items of clothing C being washed and water H for washing the items. An induction motor IM is connected to the drum by drive apparatus (not shown) to rotate the drum. The rotating speed of drum D at any one time tends to be variable, and without speed control the speed is dependent upon the number of items being washed and the amount of water in the drum at that time.

An improvement of the present invention comprises speed control means 1 for regulating the drum rotating speed within a preselected speed range. As shown, motor IM is connected to an inverter 3. Both motor IM and inverter 3 are of conventional construction. Line voltage at a fixed voltage and frequency is applied across a pair of input lines L1 and L2 to a conventional front end converter 5. The converter output is applied to the input of the inverter. The inverter in turn generates a voltage for driving the induction motor. The voltage and frequency characteristics of the power supplied to the induction motor determine the speed at which the motor operates and, consequently, the speed at which drum D rotates.

Speed control means 1 includes a microprocessor 7 having an analog to digital converter 9 whose analog input is the bus current supplied to inverter 3 from front end converter 5. Similarly, an analog to digital converter 11 of the microprocessor digitizes the voltage output of converter 5.

The digital output of converter 9 (the inverter current signal) is supplied to a filter 13 within the microprocessor. Filter 13 takes the instantaneous, digitized inverter current samples and from them extracts an average inverter current value. This is a running average taken over a relatively short time period such as one or a few cycles of the power waveform. The average current value is then provided as an input to a memory 15 within the microprocessor. Memory 15 contains a table of values of converter output voltages (and, optionally, frequencies) as a function of average inverter current. The values within the table are based upon prior knowledge of and experience with the washing machine system.

The desired voltage value corresponding to the current input from filter 13 is taken from the memory and provided to a summing point 17. The summing point is also provided with the digital output of converter 11. A feedback or error signal is developed at summing point 17, based upon the actual voltage output of converter 5 (as digitally represented by the output of converter 11) and the preferred or desired voltage (as provided by the look-up table within memory 15). If there is a difference between the actual and preferred voltage values, a feedback signal is supplied to front end converter 5 to modify the output of the converter. The implementation of such modifications is well known. For example, it is well known that the output of a converter can be varied by changing its voltage and/or changing its frequency.

As a result, the signal provided inverter 3 from the front end converter and inverter output frequency is constantly modified, based upon the sensed current and voltage levels of the converter output, to maintain the speed of the washing machine drum at a relatively constant speed. The feedback system is designed to ensure that the induction motor drives drum D so that its rotating speed remains within a preselected ranges of speeds (i.e., within approximately 3-5% of its nominal value, irrespective of load). Speed control accomplished in this manner reduces motor flux at light washing loads and also keeps acoustic noise generated by the motor to a minimum.

Because of the construction of the speed control, a washing machine utilizing the improvement of the present invention does not require external speed sensors in order to regulate drum rotating speed. The only sensors present are those already used for proper operation of the converter and inverter, namely the inverter current sensor and the inverter voltage sensor.

This minimizes appliance cost without degrading the ability of the components, for example, the microprocessor, utilized in the washing machine. At the same time, the reduction of motor flux for lighter loads improves the efficiency of the system and the minimizing of acoustic noise provides for a quieter washing machine.

In view of the above it will be seen that the various objects and features of the present invention are achieved and other advantageous results obtained.

As various changes could be made in the above systems and methods without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a washing machine having a rotatable washing drum for holding items to be washed and water for washing the items, an induction motor for rotatably driving the drum, said induction motor being powered by a.c. power from an inverter, the rotating speed of the drum at any one time tending to be dependent upon the number of items being washed and the amount of water in the drum at that time, the improvement comprising speed control means for regulating the drum speed within a preselected speed range, said speed control means including means for sensing the inverter input voltage, means for sensing the inverter input current, and speed maintaining means responsive solely to both the inverter input current and the inverter input voltage and frequency to maintain the drum speed within the selected range, said inverter being responsive to the speed maintaining means to change the frequency of the a.c. output of the inverter in the amount required to maintain the drum speed within the selected range.

2. The washing machine speed control as set forth in claim 1 wherein the inverter input current sensing means has an analog output, further including analog-to-digital converting means for converting said analog output to a digital output and for supplying the digital output to the speed maintaining means.

3. The washing machine speed control of claim 2 including means responsive to the inverter current to adjust both the inverter voltage and the frequency of the power applied to the inverter so that the motor maintains the drum speed within the selected range.

4. The washing machine speed control as set forth in claim 1 wherein the motor is a three-phase induction motor.

5. In a washing machine having a rotatable washing drum for holding items to be washed and water for washing the items, an induction motor for rotatably driving the drum, said induction motor being powered by an inverter, the rotating speed of the drum at any one time tending to be dependent upon the number of items being washed and the amount of water in the drum at that time, the improvement comprising speed control means for regulating the drum speed within a preselected speed range, said speed control means including means for sensing the inverter voltage, means for sensing the inverter current, and speed maintaining means responsive solely to the inverter current and the inverter voltage and frequency to maintain the drum speed within the selected range, the inverter current sensing means having an analog output, analog-to-digital converting means for converting said analog output to a digital output and for supplying the digital output to the speed maintaining means, the inverter voltage sensing means having an analog output, further including second analog-to-digital converting means for converting the analog output representing the inverter voltage to a digital output representing the inverter voltage and for supplying the digital output representing the inverter voltage to the speed maintaining means.

6. The washing machine speed control as set forth in claim 5 wherein the speed maintaining means includes memory means for storing load information as a function of inverter current, said memory means being responsive to the digital inverter current output to provide a digital signal representing a desired inverter voltage.

7. The washing machine speed control as set forth in claim 6 further including digital filter means between the inverter current analog-to-digital converting means and the memory means for deriving from the output of the inverter current analog-to-digital converting means a digital signal representing the average value of the inverter current.

8. The washing machine speed control as set forth in claim 6 wherein the speed maintaining means includes means for comparing the desired inverter voltage digital signal with the digital output representing the actual inverter voltage and for generating an error signal from the difference, said error signal being used to control the actual voltage applied to the inverter.

9. In a washing machine having a rotatable washing drum for holding items to be washed and water for washing the items, an induction motor for rotatably driving the drum, said induction motor being powered by an inverter, the rotating speed of the drum at any one time tending to be dependent upon the number of items being washed and the amount of water in the drum at that time, the improvement comprising speed control means for regulating the drum speed within a preselected speed range, said speed control means including means for sensing the inverter voltage, means for sensing the inverter current, and speed maintaining means responsive solely to the inverter current and the inverter voltage and frequency to maintain the drum speed within the selected range, the inverter current sensing means having an analog output, analog-to-digital converting means for converting said analog output to a digital output and for supplying the digital output to the speed maintaining means, means responsive to the inverter current to adjust both the inverter voltage and the frequency of the power applied to the inverter so that the motor maintains the drum speed within the selected range, including a front end converter which supplies power to the inverter, wherein the speed maintaining means includes feedback means for supplying a control input to the converter whose characteristics reflect desired voltage output from the converter, the converter being responsive to said control input to adjust the voltage output supplied to the inverter, whereby the inverter drives the motor to turn the drum at a rotating speed within the selected range.

10. The washing machine speed control as set forth in claim 9 wherein the feedback means control input includes a signal representing the desired frequency for the converter, said converter being responsive to said desired frequency signal to adjust its frequency.

11. In a washing machine having a rotatable washing drum for holding items to be washed and water for washing the items, an induction motor for rotatably driving the drum, said induction motor being powered by an inverter, the rotating speed of the drum at any one time tending to be dependent upon the number of items being washed and the amount of water in the drum at that time, the improvement comprising speed control means for regulating the drum speed within a preselected speed range, said speed control means including means for sensing the inverter voltage, means for sensing the inverter current, and speed maintaining means responsive solely to the inverter current and the inverter voltage and frequency to maintain the drum speed within the selected range, said speed maintaining means including memory means for storing load information as a function of inverter current, said memory means being responsive to the inverter current to provide a signal representing a desired inverter voltage.

* * * * *